United States Patent [19]

Molnar

[11] Patent Number: 4,701,948
[45] Date of Patent: Oct. 20, 1987

[54] COMMUNICATION SYSTEM HAVING SEPARATE UNIDIRECTIONAL INFORMATION SIGNALLING

[75] Inventor: Gerald Molnar, Ottawa, Canada

[73] Assignee: Trillium Telephone Systems Inc., Kanata, Canada

[21] Appl. No.: 839,521

[22] Filed: Mar. 14, 1986

[30] Foreign Application Priority Data

Nov. 7, 1985 [CA] Canada .................................. 494861

[51] Int. Cl.⁴ ........................ H04M 3/42; H04Q 3/10
[52] U.S. Cl. ................................... 379/165; 379/217; 379/252; 379/257
[58] Field of Search ............... 379/165, 157, 217, 251, 379/252, 253, 257

[56] References Cited

U.S. PATENT DOCUMENTS

4,412,102 10/1983 Ogawa et al. ...................... 379/165

FOREIGN PATENT DOCUMENTS

1594391 7/1981 United Kingdom .
2068684A 8/1981 United Kingdom .

Primary Examiner—James L. Dwyer
Attorney, Agent, or Firm—Alan H. Levine

[57] ABSTRACT

A bidirectional communication system having separate unidirectional information signalling for connection to one or more signal ports, comprised of a first switching matrix for effecting bidirectional communication between one or more of the signal ports and a second separate switching matrix for establishing unidirectional communication from one or more information signal sources to a predetermined one or more of the signal ports. Preferably, the communication system is a telephone system and the signal ports are local subscriber sets and outside telephone lines. The information signal sources can be, for instance, supervisory tone generating circuits such as DTMF generators, RING BACK, DIAL TONE or BUSY/ERROR signal generators. Alternatively, the signal sources may be music on hold circuits or circuits for generating out of voice band data signals. According to the present invention, the information signals are transmitted to the one or more signal ports independently of signal traffic in the first switching matrix, resulting in highly efficient signal switching through the first and second matrices.

29 Claims, 7 Drawing Figures

COMMUNICATION SYSTEM HAVING SEPARATE UNIDIRECTIONAL INFORMATION SIGNALLING

This invention relates in general to communication systems, and more particularly to a telephone system having an independent unidirectional information tone signalling subsystem.

Communication systems such as data switching systems, PABXs and key telephone systems typically generate various unidirectional information signals for transmission between various signal ports. For instance, in telephone systems, supervisory tone signals are generated for providing an indication to a subscriber of the status of his or her call. For example, in the event a local subscriber wishes to place a call through a key telephone system, a central controller or key service unit (KSU) typically transmits dial tone to the local subscriber set in response to the subscriber lifting the handset off-hook. Alternatively, in the event all outside lines or trunks are in use, the KSU typically generates busy tone to the local subscriber set.

In addition to dial tone, the KSU also typically generates and transmits further information signals or supervisory tones such as tone ringing signals, DTMF signals, busy/error tone signals, ring back as well as background music to various ones of the local subscriber sets or outside telephone lines.

According to prior art communication systems, information signals such as supervisory tones and background music were typically transmitted to the various signal ports, such as subscriber sets and outside lines via a plurality of junctors of a central switching matrix or circuit switch, which also typically established interconnections between various ones of the subscriber sets and outside lines. However, it has been discovered that information signalling transmission performance characteristics of prior art circuit switches are dependent upon the amount of signal traffic being transmitted through the circuit switch.

For instance, in the event all of the circuit switch junctors of a prior art telephone system were being utilized for effecting a plurality of communication paths between various subscriber sets and outside lines, or for providing tone signalling, and a further one of the subscribers was desirous of accessing an outside line and lifts his or her handset off-hook, the circuit switch matrix would typically be unable to transmit a busy signal to the further subscriber set since each of the junctors was already in use.

Also, according to the prior art, in the event an outside line had been put on hold, background music was typically transmitted thereto via the circuit switch matrix. However, in the event all of the circuit switch junctors were in use and it was desired that an additional communication path be established through the circuit switch matrix while music was still being transmitted to the outside line, the central controller typically disconnected the music source from the outside line via the circuit switch matrix in order to utilize the junctor on which the music was being transmitted, for establishing the additional communication path. This is because, according to the operation of well known telephone systems, the provision of music is typically accorded a lower priority in terms of circuit switch junctors being assigned thereto, than establishment of a communication path through the circuit switch matrix.

According to the present invention, separate switching matrices are utilized for effecting communication paths between local subscriber sets and outside lines, and for connecting one or more unidirectional signal sources, such as supervisory tone signalling sources, and music sources to the local subscriber sets and outside lines. Thus, transmission of supervisory tones and background music are independent of signal traffic flowing through the circuit switch matrix. Also, in the event all junctors of the circuit switch matrix are in use, an incoming call can be kept on hold and receive background music without requiring the use of a circuit switch junctor. In addition, busy tone can be distributed to any one of the local subscriber sets or outside lines even though all of the circuit switch junctors may be in use.

Prior art subscriber sets typically incorporated internal ringing circuits for generating tone ringing signals in response to receiving control signals generated by the central controller. The prior art sets were expensive and of complicated design as a result of the inclusion of such tone ringing circuits. According to the present invention, tone ringing may be transmitted via the separate supervisory tone signalling matrix to one or more of the local subscriber sets from a central tone generating circuit. Consequently, the cost of proprietary subscriber sets for use in the telephone system according to the present invention are inexpensive and of simple design.

By utilizing separate circuit switch and supervisory tone switching matrices, the prior art disadvantages are overcome, particularly in the case of small switching systems such as key telephone systems wherein each of a small number of junctors are at a premium.

A better understanding of the present invention will be obtained with reference to the detailed description below in conjunction with the following drawings, in which.

Figure 1:
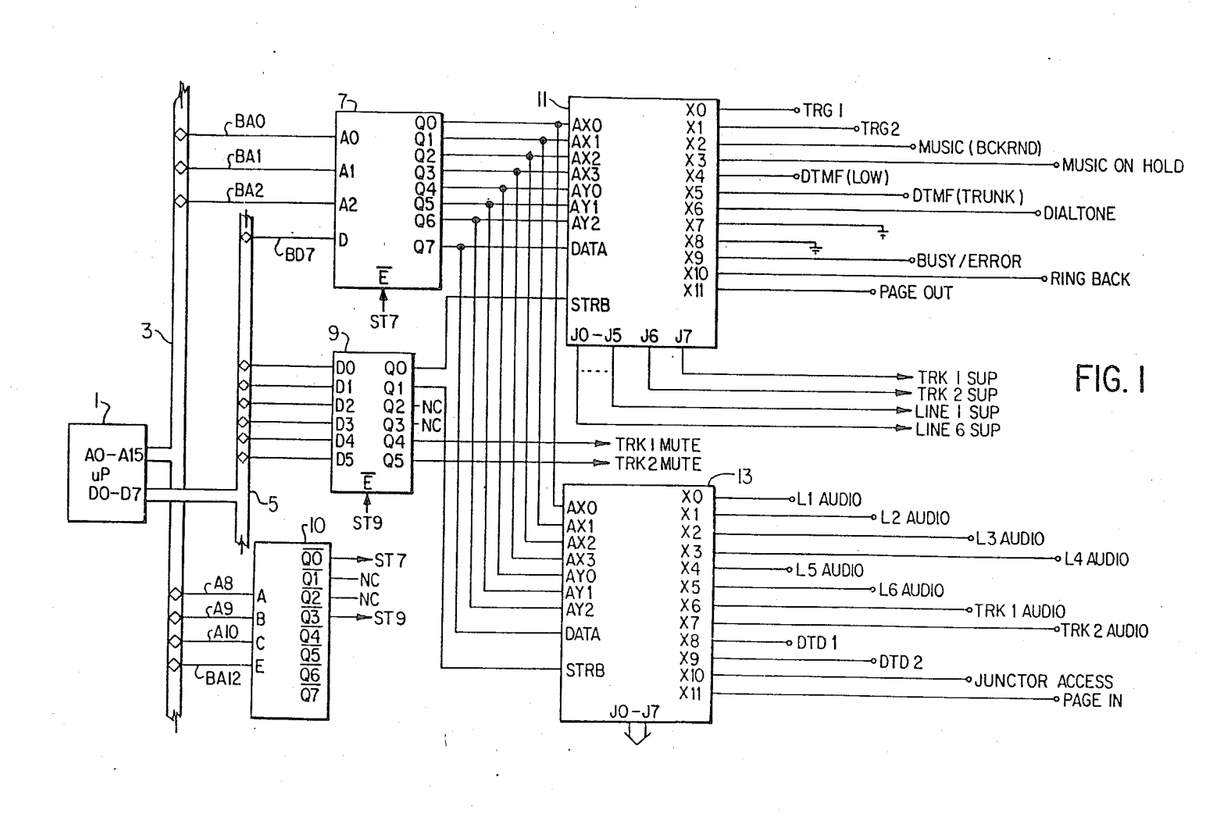
FIG. 1 is a block schematic diagram of a key service unit according to a preferred embodiment of the present invention.

With reference to FIG. 1 a central processor 1, such as a microprocessor, is shown having address terminals A0–A15 connected to a buffered address bus 3, and data terminals D0–D7 connected to a buffered data bus 5. Buffered address lines BA0, BA1 and BA2 of address bus 3 are connected to A0, A1 and A2 inputs of a latch 7.

D0–D5 inputs of a latch 9 are connected to buffered data lines BD0–BD5 of data bus 5, and a data input D of latch 7 is connected to buffered data line BD7.

Enable inputs $\overline{E}$ of latches 7 and 9 are connected to $\overline{Q0}$ and $\overline{Q3}$ outputs of a latch 10. Address inputs A, B and C of latch 10 are connected to address lines A8–A10 (unbuffered) respectively of address bus 3, and an enable input E is connected to buffered address line BA12. Latch 10 generates enable signals ST7 and ST9 on the $\overline{Q0}$ and $\overline{Q3}$ outputs for enabling latches 7 and 9 in response to receiving predetermined signals from the address bus 3.

Outputs Q0-Q3 of latch 7 are connected to AX0-AX3 address inputs of a supervisory tone signal switching matrix 11 and a circuit switch matrix 13. Q4-Q6 outputs of latch 7 are connected to AY0-AY2 inputs of matrices 11 and 13, and output Q7 of latch 7 is connected to DATA inputs of matrices 11 and 13.

The Q0 output of latch 9 is connected to a strobe input STRB of matrix 11, the Q1 output is connected to a strobe input STRB of matrix 13, and the Q4 and Q5 outputs carry TRK1 MUTE and TRK2 MUTE control signals respectively, for connection to a pair of trunk circuits, such as the trunk circuit discussed below with reference to FIG. 7.

The X0 and X1 terminals of matrix 11 are connected to output terminals TRG1 and TRG2 of a pair of tone ringing generators described in greater detail below with reference to FIG. 5. Signal terminals X2 and X3 are connected to background MUSIC (BCKRND) and MUSIC ON HOLD terminals respectively of a music source interface circuit discussed in greater detail below with reference to FIG. 3. Terminals X4 and X5 of matrix 11 are connected to DTMF (LOW) and DTMF (TRUNK) terminals respectively of a DTMF generator discussed in greater detail below with reference to FIG. 2. Terminals X6, X9 and X10 are connected to DIAL TONE, BUSY/ERROR, and RING BACK terminals respectively of the supervisory tone signalling circuit discussed in greater detail below with reference to FIG. 5. The X11 terminal of matrix 11 is connected to a PAGE OUT terminal of a paging circuit discussed in greater detail below with reference to FIG. 4, and terminals X7 and X8 of matrix 11 are connected to ground.

Terminals J0-J5 of matrix 11 are connected respectively to supervisory tone inputs LINE 6 SUP-LINE 1 SUP of six line circuits (not shown), such as the line circuit discussed below with reference to FIG. 6. Terminals J6 and J7 are connected to supervisory tone signal inputs TRK2 SUP and TRK1 SUP of a pair of trunk circuits (not shown), such as the circuit discussed below with reference to FIG. 7.

Terminals X0-X6 of matrix 13 are connected to bidirectional audio lines L1 AUDIO-L6 AUDIO connected to six corresponding line circuits, such as the line circuit discussed in greater detail below with reference to FIG. 6. Bidirectional trunk audio lines TRK1 AUDIO and TRK2 AUDIO are connected to the X6 and X7 terminals of matrix 13 and to audio inputs of a pair of trunk circuits, such as the aforementioned trunk circuit discussed in greater detail below with reference to FIG. 7.

Terminals X8 and X9 of matrix 13 are connected to bidirectional lines, DTD1 and DTD2, connected to a pair of dial tone detectors, not shown, while the X10 terminal is connected to a junctor access line JNJ ACC connected to a remote junctor access circuit (not shown). The dial tone detectors and junctor access circuit are well known in the art but do not form part of the present invention.

Terminal X11 of matrix 13 is connected to a PAGE IN terminal of the paging circuit referred to above and discussed in greater detail below with reference to FIG. 4.

According to the preferred embodiment, individual ports of switching matrix 13 may be interconnected for establishing communication between various local subscriber sets, outside lines, dial tone detectors, etc. For instance, a call may be placed between adjacent subscriber sets, between a subscriber set and an outside line, between three subscriber sets or between one subscriber set and two outside lines or two subscriber sets and one outside line.

Similarly, individual ports of switching matrix 11 may be connected to various ones of the terminals J0-J7 for transmitting supervisory tones or music to one or more of the trunk or line circuits connected to local subscriber sets and outside lines.

According to a successful prototype of the invention, switching matrices 11 and 13 were 8 × 12 space or crosspoint switching matrices such as the SGS model M093. In order to connect one of the terminals X0-X11 to one of terminals J0-J7, addressing information is transmitted to the switches 11 and 13 from the Q0-Q7 outputs of latch 7. A junctor strobe signal in the form of a logic high pulse, is generated by microprocessor 1 and applied to the data bus 5 and therefrom to the strobe input STRB of a predetermined one of switches 11 and 13 via latch 9.

Tables 1-4 are truth tables for illustrating the connection of the various ports of crosspoint switching matrices 11 and 13 in response to various address signals being applied to the address inputs thereof, according to the successful prototype. The J0-J7 terminals of crosspoint switching matrix 13 are junctor terminals for connection to one or more external expansion ports (not shown), and a logic high signal applied to the DATA inputs of matrices 11 and 13 establishes a connection between a selected one of the terminals X0-X11 and J0-J7.

TABLE 1

| Connection | Matrix 11 | | |
|---|---|---|---|
| | AY2 | AY1 | AY0 |
| J0 (LINE 6 SUP) | 0 | 0 | 0 |
| J1 (LINE 5 SUP) | 0 | 0 | 1 |
| J2 (LINE 4 SUP) | 0 | 1 | 0 |
| J3 (LINE 3 SUP) | 0 | 1 | 1 |
| J4 (LINE 2 SUP) | 1 | 0 | 0 |
| J5 (LINE 1 SUP) | 1 | 0 | 1 |
| J6 (TRK 2 SUP) | 1 | 1 | 0 |
| J7 (TRK 1 SUP) | 1 | 1 | 1 |

TABLE 2

| Connection | Matrix 11 | | | |
|---|---|---|---|---|
| | AX3 | AX2 | AX1 | AX0 |
| TRG 1 | 0 | 0 | 0 | 0 |
| TRG 2 | 0 | 0 | 0 | 1 |
| MUSIC (BCKRND) | 0 | 0 | 1 | 0 |
| MUSIC ON HOLD | 0 | 0 | 1 | 1 |
| DTMF (LOW) | 0 | 1 | 0 | 0 |
| DTMF (TRUNK) | 0 | 1 | 0 | 1 |
| DIAL TONE | 1 | 0 | 0 | 0 |
| NC | 1 | 0 | 0 | 1 |
| NC | 1 | 0 | 1 | 0 |
| BUSY/ERROR | 1 | 0 | 1 | 1 |
| RING BACK | 1 | 1 | 0 | 0 |
| PAGE OUT | 1 | 1 | 0 | 1 |

TABLE 3

| Connection | Matrix 13 | | |
|---|---|---|---|
| | AY2 | AY1 | AY0 |
| J0 | 0 | 0 | 0 |

TABLE 3-continued

| Connection | Matrix 13 | | |
|---|---|---|---|
| | AY2 | AY1 | AY0 |
| J1 | 0 | 0 | 1 |
| J2 | 0 | 1 | 0 |
| J3 | 0 | 1 | 1 |
| J4 | 1 | 0 | 0 |
| J5 | 1 | 0 | 1 |
| J6 | 1 | 1 | 0 |
| J7 | 1 | 1 | 1 |

TABLE 4

| Connection | Matrix 13 | | | |
|---|---|---|---|---|
| | AX3 | AX2 | AX1 | AX0 |
| L1 AUDIO | 0 | 0 | 0 | 0 |
| L2 AUDIO | 0 | 0 | 0 | 1 |
| L3 AUDIO | 0 | 0 | 1 | 0 |
| L4 AUDIO | 0 | 0 | 1 | 1 |
| L5 AUDIO | 0 | 1 | 0 | 0 |
| L6 AUDIO | 0 | 1 | 0 | 1 |
| TRK1 AUDIO | 1 | 0 | 0 | 0 |
| TRK2 AUDIO | 1 | 0 | 0 | 1 |
| DTD 1 IN | 1 | 0 | 1 | 0 |
| DTD 2 IN | 1 | 0 | 1 | 1 |
| JNC ACC | 1 | 1 | 0 | 0 |
| PAGE IN | 1 | 1 | 0 | 1 |

Thus, in operation, in order to connect one of the line circuits (for example L1 AUDIO) for communication with an outside line (for example via TRK 1 AUDIO), an address signal in the form of 0 0 0 0 is applied to the AX3-AX0 inputs of switching matrix 13 and a junctor strobe signal pulse is generated by microprocessor 1 and applied to the STRB input of matrix 13 via the Q1 output of latch 9. Subsequently, an address signal of the form 1 0 0 0 is applied to the AX3-AX0 inputs of switching matrix 13 and a further junctor strobe signal is applied to the STRB input, thereby completing a communication path between the L1 AUDIO and TRK1 AUDIO lines.

Similarly, in order to transmit supervisory tone signals (for example DIAL TONE) to an off-hook subscriber set connected to one of the line circuits (for example via L1 AUDIO), an address signal of the form 1 0 0 0 is applied to the AX3-AX0 inputs of switching matrix 11 and a signal of the form 1 0 1 is applied to the AY2-AY0 inputs of switching matrix 11, and a junctor strobe signal pulse is generated by microprocessor 1 and applied to the STRB input of matrix 11 via the Q1 output of latch 9, thereby completing a signal connection between the X6 terminal and the J5 terminal of matrix 11.

Figure 2:
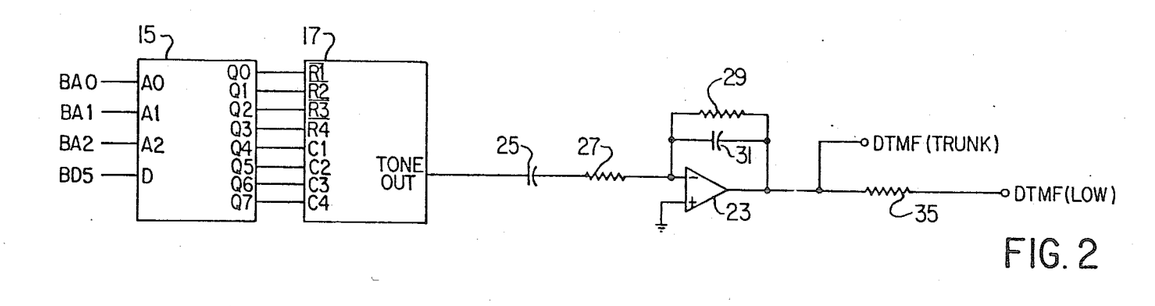
FIG. 2 is a simplified schematic diagram of a DTMF tone generator according to the preferred embodiment.

FIG. 2 illustrates a DTMF generator comprised of a multiplexing latch 15 having A0-A2 inputs thereof connected to buffered address lines BA0-BA2 of address bus 3 illustrated in FIG. 1, and a data input D connected to buffered data line BD5 of data bus 5. Outputs Q0-Q7 of latch 15 are connected to $\overline{R1}$-R4, C1-C4 control inputs of a DTMF tone generator circuit 17. DTMF tone generator circuit 17 may be any one of a number of well known DTMF generators such as those manufactured by MITEL SEMICONDUCTOR INC., or MOSTEK CORPORATION.

DTMF generator circuit 17 generates DTMF signals in a well known manner in response to receiving control signals on the $\overline{R1}$-$\overline{R4}$ and C1-C4 inputs thereof. Generated DTMF tone signals are carried by a TONE OUT terminal of circuit 17 and applied to a differential amplifier 23 via AC coupling capacitor 25 and input resistor 27. The inverting input of amplifier 23 is connected to an output thereof in a well known manner via feedback resistor 29 in parallel with filtering capacitor 31 for filtering or smoothing waveform edges of the normally step-wise sinusoidal signal output from circuit 17. The output of amplifier 23 is connected to the aforementioned DTMF (TRUNK) terminal connected to the X5 terminal of matrix 11 (FIG. 1) for providing line level DTMF signals to an outside line via one of the trunk circuits (such as trunk circuit 1 discussed in greater detail below with reference to FIG. 7). The DTMF tones appearing on the DTMF (TRUNK) terminal are attenuated or normalized via output resistor 35 for application to the DTMF (LOW) terminal connected to terminal X4 of matrix 11. The normalized DTMF signal appearing on the DTMF (LOW) terminal is typically transmitted to a subscriber set during dialing or to provide single tone acknowledgements to a subscriber of a special feature being implemented by the telephone system, such as DO NOT DISTURB, etc.

Figure 3:
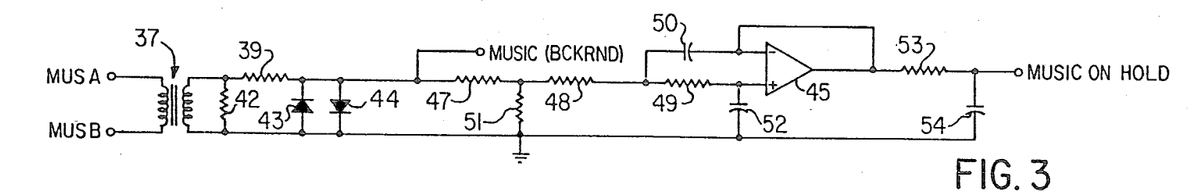
FIG. 3 is a simplified schematic diagram of a background music interface circuit according to the preferred embodiment.

An external source of music such as a radio or tape deck may be connected to matrix 11 (FIG. 1) via a music source interface circuit illustrated in FIG. 3. The source of music is connected to inputs MUSA and MUSB and coupled via transformer 37 and resistors 39 to the MUSIC (BCKRND) terminal connected to the X2 terminal of matrix 11. An input resistor 42 and oppositely polled amplitude limiting diodes 43 and 44 are connected to resistors 39 and 41 and to ground in a well known manner. Music signals carried by the MUSA and MUSB terminals and appearing on the MUSIC (BCKRND) terminal are also applied differentially to inverting and non-inverting inputs of an amplifier 45 through voltage dividing resistors 47, 48, and 51, and resistor 49 and a capacitor 50. The inverting input of amplifier 45 is connected to an output thereof in a well known manner, and a voltage dividing resistor 51 is connected to the node connecting resistors 47 and 48 and to ground, and a filtering capacitor 52 is connected to the non-inverting input of amplifier 45 and to ground. Music signals received by amplifier 45 are transmitted to the MUSIC ON HOLD terminal connected to terminal X3 of matrix 11 (FIG. 1) via output resistor 53. A further filtering capacitor 54 is connected to the MUSIC ON HOLD terminal and ground in a well known manner. Music signals appearing on the MUSIC ON HOLD terminal are bandlimited and level limited via the combination of resistors 47, 48, 49 and 51, capacitor 50 and amplifier 45 with respect to the MUSIC (BCKRND) terminal in order to conform to FCC and CS03 music on trunk standard signal level requirements.

Figure 4:
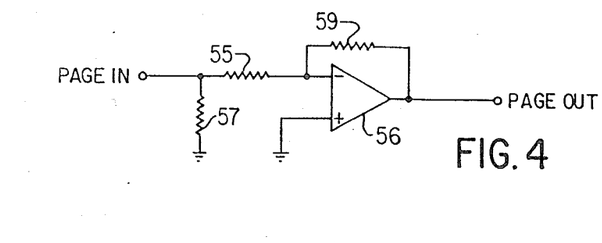
FIG. 4 is a simplified schematic diagram of a paging circuit according to the preferred embodiment.

With reference to FIG. 4, paging signals received from one of the line circuit terminals L1 AUDIO-L6 AUDIO via matrix 13 and appearing on terminal X11 are applied via resistor 55 to an inverting input of an amplifier 56. An input resistor 57 provides correct junctor loading for the X11 terminal of matrix 13. Gain controlling resistors 58 and 59 are connected to the non-inverting input of amplifier 56 and ground, and to the inverting input and output of amplifier 56 respectively, in a well known manner. The output of paging amplifier 56 is connected to the PAGE OUT terminal connected to the X11 terminal of matrix 11 such that the paging signal received from the line circuit selected via matrix 13 is tranmitted via matrix 11 to a further one or more of the line circuits via the LINE 1 SUP-LINE 6 SUP terminals.

Figure 5:
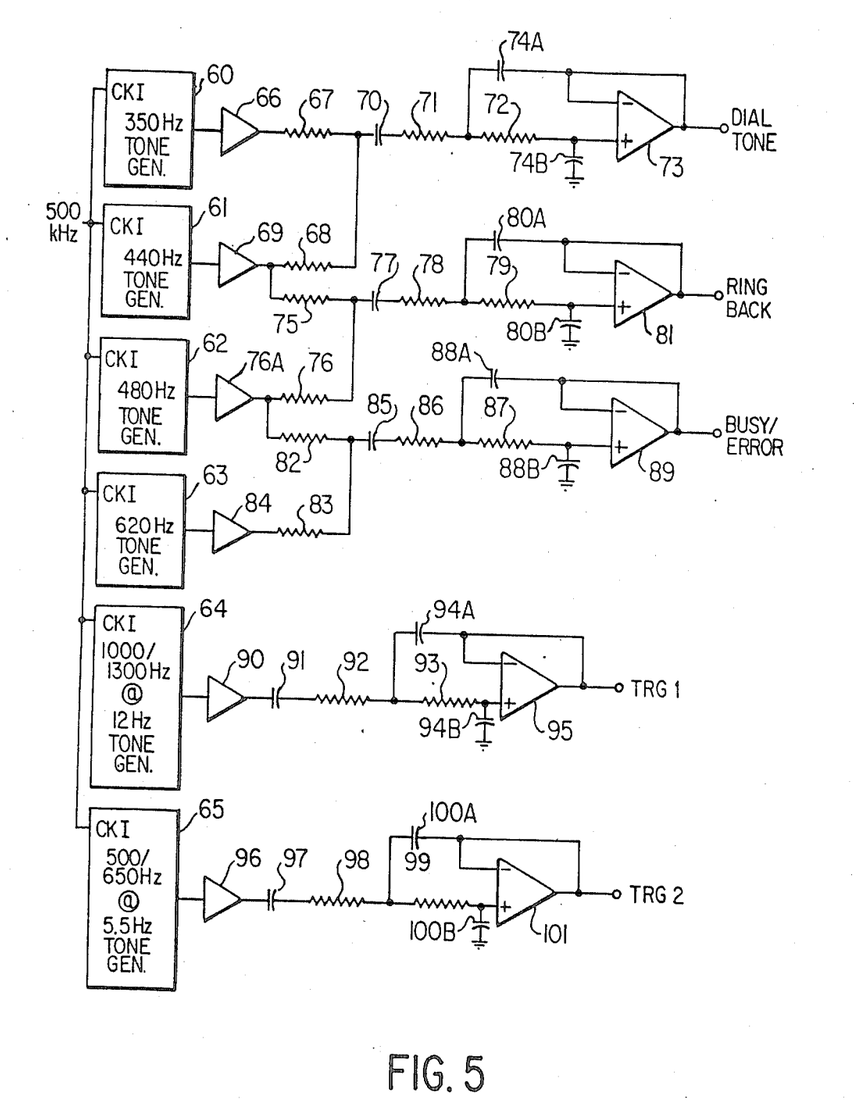
FIG. 5 is a simplified schematic diagram of a supervisory tone signal generating circuit according to the preferred embodiment.

With reference to FIG. 5, a plurality of microcontrollers 60–65 are utilized for generating the following squarewave tone signals: 350 hertz, 440 hertz, 480 hertz, 620 hertz, 1000/1300 hertz modulated at 12 hertz, and 500/650 hertz modulated at 5.5 hertz. The tone generators 60–65 each have a clock input CKI thereof connected to a source of 500 kilohertz clock signal and are individually programmed to generate signals at the respective frequencies.

The 350 hertz tone signal from generator 60 is applied via buffer 66 and resistor 67 to a node connecting resistor 67 and a further resistor 68 connected via a buffer 69 to the output of the 440 hertz tone generator 61. Accordingly, the 350 hertz and 440 hertz tone signals are summed at the aforementioned node and applied via AC coupling capacitor 70 to a second order filter arrangement comprised of resistors 71 and 72, differential amplifier 73 and capacitors 74A and 74B. The filter arrangement substantially eliminates unwanted harmonics and distortion associated with the squarewave output signal of generator 60. The output of amplifier 73 is connected to the DIAL TONE terminal connected to the X6 terminal of matrix 11.

In a similar manner, the 440 hertz and 480 hertz squarewave signals from generators 61 and 62 are applied to buffer amplifiers 69 and 76A for generating a predetermined source current, and summed at the node connecting resistors 75 and 76, and subsequently filtered via the second order filter arrangement of elements consisting of AC coupling capacitor 77, input resistors 78 and 79, capacitors 80A and 80B, and amplifier 81, for generating sinusoidal signals in response to reception of the squarewave signals. The output of amplifier 81 is connected to the RING BACK terminal connected to the X10 terminal of matrix 11 (FIG. 1).

The 480 hertz signal from generator 62 is applied via buffer 76A and resistor 82 to a summing node connecting resistor 82 and a resistor 83 connected to the output of 620 hertz tone generator 63 via buffer 84. The 480 hertz and 620 hertz signals are summed at the node connecting resistors 82 and 83 and filtered via the second order filter arrangement comprised of AC coupling capacitor 85, resistors 86 and 87, capacitors 88A and 88B, and amplifier 89, and applied to the BUSY/ERROR terminal connected to the X9 terminal of matrix 11 (FIG. 1).

Tone generator 64 was programmed to generate a squarewave signal modulated between the frequencies of 1000 and 1300 hertz at a frequency of 12 hertz, in order to provide a tone ringing signal which is translated via buffer 90 and the second order filter arrangement comprised of a coupling capacitor 91, resistors 92 and 93, capacitors 94A and 94B, and amplifier 95 to the TRG 1 terminal connected to the X0 terminal of matrix 11 (FIG. 1).

Similarly, tone generator 65 is internally programmed to generate a tone which varies in frequency between 500 and 650 hertz at a rate of 5.5 hertz for application to the TRG 2 terminal connected to the X1 terminal of matrix 11 via buffer 96, AC coupling capacitor 97, resistors 98 and 99, capacitors 100A and 100B, and differential amplifier 101.

The tone ringing, ring back and busy/error signals generated by the circuitry illustrated in FIG. 5 are continuous tones. However, according to North American telephone systems, predetermined tone cadences have been standardized as follows:

TABLE 5

| Signal | Cadence | Frequency |
| --- | --- | --- |
| DIAL TONE | continuous | 360/440 Hz |
| RINGBACK | 1 sec. on; 3 sec. off | 440/480 Hz |
| BUSY | ½ sec. on; ½ sec. off | 480/625 Hz |
| ERROR | ¼ sec. on; ¼ sec. off | 480/625 Hz |
| TONE RINGING | ¼ sec. on; ¼ sec. off; ¼ sec. on; ¼ sec. off; ¼ sec. on; ¼ sec. off; 2 sec. pause | variable |

Accordingly, cadencing of the RING BACK, BUSY/ERROR, TRG1 and TRG2 tones is accomplished by alternately connecting and disconnecting the supervisory tone signal generating circuits via matrix 11 according to the procedure discussed above with reference to Tables 1 and 2.

For example, in the event BUSY signal is being transmitted to the first line circuit via the LINE 1 SUP terminal, and an ERROR signal is being transmitted to the second line circuit via the LINE 2 SUP terminal, the BUSY/ERROR signal source is alternately connected to and disconnected from the J4 and J5 terminals of matrix 11 according to the predetermined cadences discussed with reference to Table 5 under control of microprocessor 1. Also, because the J0–J7 terminals of matrix 11 go to a high impedance state when disconnected, any number of line and trunk circuits may be simultaneously connected to the same supervisory signal generator without affecting the quality of the generated tone.

Figure 6:
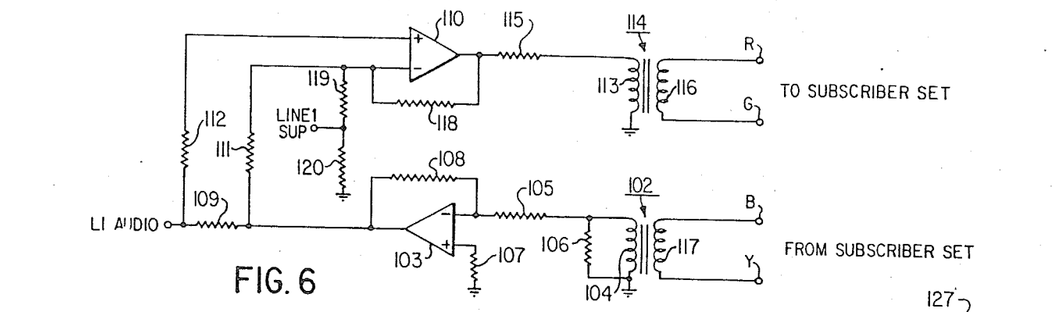
FIG. 6 is a simplified schematic diagram of a line circuit according to the preferred embodiment.

FIG. 6 is a simplified schematic diagram of a line circuit (such as a line circuit connected to the L1 AUDIO terminal connected to terminal X0 of matrix 13 in FIG. 1), the line circuits connected to signal ports X1–X5 being of substantially similar design. Signals received on the B and Y leads are coupled via transformer 102 to differential amplifier 103 for application to the L1 AUDIO terminal, and therefrom to the X0 terminal of crosspoint switching matrix 13. A secondary coil 104 of transformer 102 is connected via resistor 105 to the inverting input of amplifier 103, and an impedance matching resistor 106 (preferably 600 ohms) is connected across the secondary coil 104. The non-inverting input of amplifier 103 is connected to ground via resistor 107, and an output of amplifier 103 is connected to the inverting input thereof via resistor 108. The output of amplifier 103 is connected to the L1 AUDIO terminal via output resistor 109 and to an inverting input of amplifier 110 via input resistor 111.

Signals received from crosspoint switching matrix 13 via the L1 AUDIO terminal are applied to a non-inverting input of amplifier 110 through input resistor 112. The resistance of resistors 109, 111, and 112 are chosen such that signals output from amplifier 103 are applied with equal amplitude to the inverting and non-inverting inputs of amplifier 110 so as to be cancelled therein. An output of amplifier 110 is connected to a primary coil 113 of an audio transformer 114 via an output resistor 115. Secondary coils 116 and 117 of transformers 114 and 102 respectively are connected to the R, G and B, Y leads of a four wire conductor connected at an opposite end to a remote subscriber set. Accordingly, unidirectional audio signal transmission is implemented between the interface circuit and remote subscriber set on separate ones of the B, Y and R, G balanced lead pairs.

An inverting input of amplifier 110 is connected to the output thereof via feedback resistor 118 in a well known manner.

Supervisory tone signals or music signals transmitted via matrix 11 and carried on the J5 terminal are applied to the LINE 1 SUP terminal and therefrom via voltage dividing resistors 119 and 120 to the inverting input of amplifier 110 for amplification thereby and transmission to the remote subscriber set.

Resistor 120 is preferably of low resistance (eg. 2k ohms) relative to resistor 119 (eg. 90k ohms) in order that in the event no supervisory tones or music signals are being carried by the LINE 1 SUP terminal, the J5 terminal of matrix 11 is in a high impedance state and the voltage on the inverting input of amplifier 110 is drawn toward ground via resistor 120. In this way, proper transmission of signals, such as speech carried by the L1 AUDIO terminal, is maintained in the absence of ground potential being applied to the LINE 1 SUP terminal from matrix 11.

Figure 7:
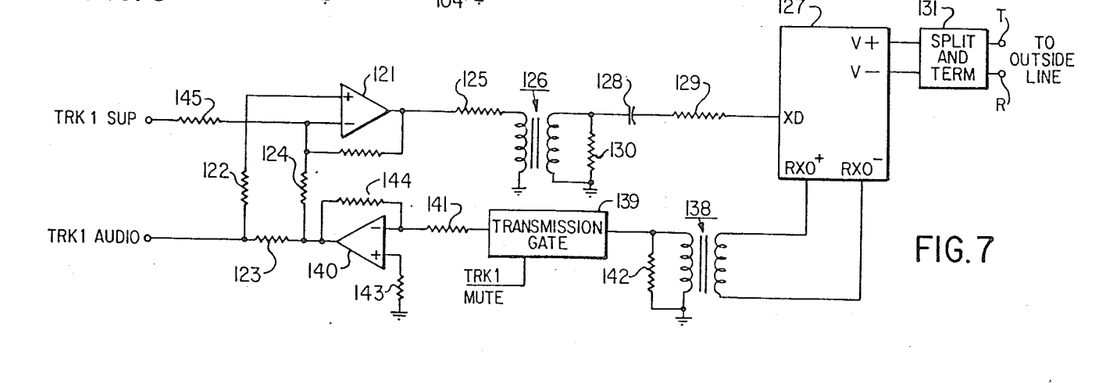
FIG. 7 is a simplified schematic diagram of a trunk circuit according to the preferred embodiment.

FIG. 7 is a schematic diagram of a trunk circuit for connection to the X6 terminal of matrix 13 via the TRK 1 AUDIO terminal and to the J7 junctor terminal of matrix 11 via the TRK 1 SUP terminal, the trunk circuit connected to the X7 terminal of matrix 13 and the J6 junctor of matrix 11 being of substantially similar design. Signals appearing on the X6 terminal of crosspoint switching matrix 13 shown in FIG. 1 are received by the TRK 1 AUDIO terminal and applied to a noninverting input of differential amplifier 121 via input resistor 122, and via resistors 123 and 124 to the inverting input of amplifier 121. The values of resistors 122, 123 and 124 are chosen such that signals appearing on the TRK 1 AUDIO terminal are differentially received by amplifier 121 and applied therefrom via output resistor 125 to an audio transformer 126 and coupled thereacross for reception by a transmit terminal XD of an electronic telephone circuit 127, via AC coupling capacitor 128 and resistor 129. An impedance matching resistor 130 is connected across a secondary coil of transformer 126 in the usual manner.

In operation, telephone circuit 127 receives signals from crosspoint switching matrix 13 and performs well known hybrid functions such as generation of side tone etc., and transmits the received signals differentially from V+ and V− terminals thereof. The tip and ring terminals T and R of the outside line, are connected via a split and terminate circuit 131 to the V+ and V− terminals of telephone circuit 127. The split and terminate circuit 131 provides circuitry for protecting telephone circuit 127 against transient voltages due to lightning strikes and other high voltage transient signals which may appear on the line.

Signals received from an external central office or PBX are applied to the V+ and V− terminals of circuit 127 via circuit 131. The telephone circuit 127 performs a 2-to-4 wire signal conversion such that the received signals are applied to the RX0+ and RX0− terminals thereof. The signals thus applied, are coupled across audio transformer 138 and applied to an inverting input of differential amplifier 140 via transmission gate 139 and input resistor 141. As discussed above with reference to FIG. 1, a TRK1 MUTE control signal is generated by latch 9 on the Q4 output thereof for disabling gate 139 under control of microprocessor 1. An impedance matching resistor 142 is connected across a secondary coil of transformer 138 in the usual manner. An non-inverting input of amplifier 140 is connected to ground via resistor 143 and an output of amplifier 140 is connected to the inverting input thereof via a feedback resistor 144 in a well known manner.

Thus, signals received from the tip and ring leads T and R, by telephone circuit 127, are applied to the RX0+ and RX0− terminals thereof and coupled via transformer 138 for amplification via amplifier 140 and applied therefrom to the TRK 1 AUDIO terminal via resistor 122.

Supervisory tone signals and background music signals carried on one of the X0–X11 terminals of matrix 11 and connected to the J7 terminal thereof, are carried via the TRK 1 SUP terminal and applied to the inverting input of amplifier 121 via input resistor 145.

In the event the tip and ring leads of the outside line are split and terminated via circuit 131 and MUSIC ON HOLD is being provided thereto, gate 139 is disable via the TRK1 MUTE signal for preventing music signals on the tip and ring leads T and R from being fed back thereto via amplifier 140.

Thus, supervisory tone signals and music are applied to the outside line without requiring utilization of one of the crosspoint switching connections of matrix 13. Hence, it can be seen that the provision of supervisory tone signals and background music or MUSIC ON HOLD is independent of signal traffic in the circuit switching matrix 13. Accordingly, such supervisory tone signals and music signals can be provided even in the event all of the connection of matrix 13 are being utilized. Also, since tone ringing is generated centrally and distributed to various ones of the line circuits via supervisory switching matrix 11, the cost and complexity of subscriber sets connected to the line circuits is significantly reduced in relation to prior art subscriber sets each of which typically required dedicated tone ringing circuit.

A person skilled in the art understanding the present invention may conceive of other embodiments or variations thereof. For instance, the communication system described herein according to the preferred embodiment is a key telephone system. However, the system can be for instance, PABX, PACX or other type of well known communication system. Also, whereas the preferred embodiment incorporates information signal sources in the form of supervisory tones, any unidirectional information signal is accommodated by the circuitry according to the present invention, such as out-of-band data signals, etc. All such embodiments and variations are believed to be within the sphere and scope of the present invention as defined by the claims appended hereto.

I claim:

1. A communication system for connection to one or more signal ports, comprising:
   (a) central control means for generating control signals,
   (b) one or more information signal source circuits,
   (c) one or more interface circuits for connection to said signal ports, including unidirectional transmit and receive signal paths,
   (d) a first switching matrix connected to said central control means for receiving predetermined ones of said control signals and in response interconnecting predetermined ones of said interface circuits for establishing one or more bidirectional communication paths between predetermined ones of said signal ports via said transmit and receive signal paths, and (e) a second switching matrix connected to said central control means, for receiving further predetermined ones of said control signals and connecting a predetermined one or more of said information signal source circuits to the transmit signal paths of one or more of said interface circuits, for establishing one or more unidirectional communication paths between predetermined ones of said information signal source circuits and signal ports via said transmit signal paths, whereby information signals are transmitted to said signal ports via said second switching matrix independently of signal traffic in said first switching matrix.

2. A communication system as defined in claim 1, wherein predetermined ones of said signal ports are comprised of local subscriber sets and outside telephone lines.

3. A communication system as defined in claim 1, wherein at least one of said information signal source circuits is a DTMF generator.

4. A communication system as defined in claim 1, wherein at least one of said information signal source circuits is a dial tone generator.

5. A communication system as defined in claim 1, wherein at least one of said information signal source circuits is a ringing tone generator.

6. A communication system as defined in claim 1, wherein at least one of said information signal source circuits is a busy/error tone generator.

7. A communication system as defined in claim 1, wherein at least one of said information signal source circuits is a ring back tone generator.

8. A communication system as defined in claim 2, wherein at least one of said information signal source circuits is a music source circuit, for generating background music for transmission to one or more of said subscriber sets.

9. A communication system as defined in claim 2, wherein at least one of said information signal source circuits is a music on hold source circuit for generating background music for transmission to one or more of said outside telephone lines.

10. A communication system as defined in claim 2, wherein at least one of said information signal source circuits is a paging amplifier having an input thereof connected to said first switching matrix and an output thereof connected to said second switching matrix, for amplifying paging signals received from one of said subscriber sets via said first switching matrix and transmitting said amplified signals to one or more other ones of said subscriber sets and said outside lines via said second switching matrix.

11. A communication system as defined in claim 1, wherein said first and second switching matrices are each comprised of space switching matrices.

12. A communication system as defined in claim 2, wherein a predetermined one or more of said interface circuits are subscriber line interface circuits for connection to respective ones of said one or more subscriber sets.

13. A communication system as defined in claim 2, wherein a predetermined one or more of said interface circuits are trunk circuits for connection to respective ones of said one or more outside lines.

14. A communication system as defined in claim 1, wherein at least one of said information signal source circuits is a DTMF generator circuit having control inputs thereof connected to said central control means, for receiving additional ones of said control signals and generating DTMF tones in response thereto, and filter means connected to said DTMF generator for filtering said DTMF tones prior to transmission of said tones via said second switching matrix.

15. A communication system as defined in claim 2, wherein at least one of said information signal source circuits is a supervisory tone generating circuit comprised of:
(a) a plurality of tone generating means for generating single tones,
(b) means for summing predetermined ones of said generated tones, and
(c) means for filtering said summed tones and transmitting said filtered tones to predetermined input terminals of said second switching matrix.

16. A communication system as defined in claim 15, wherein at least two of said tone generating means generate 350 hertz and 440 hertz single tones respectively, for producing dial tone.

17. A communication system as defined in claim 15, wherein at least two of said tone generating means generate 440 hertz and 480 hertz single tones respectively, for producing a ring back signal.

18. A communication system as defined in claim 15, wherein at least two of said tone generating means generate 480 hertz and 620 hertz single tones respectively, for producing one of either a busy or error signal.

19. A communication system as defined in claim 2, wherein at least one of said information signal source circuits is a music signal source for generating and transmitting background music to a first predetermined input terminal of said second switching matrix and level and band limiting circuitry for filtering and transmitting said background music to a further predetermined input terminal of said second switching matrix, for subsequent transmission to one of said outside telephone lines.

20. A communication system as defined in claim 1, wherein one or more of said interface circuits are each comprised of:
(a) a bidirectional signal terminal for carrying signals received from and transmitted to said first switching matrix,
(b) a unidirectional signal terminal for receiving information signals generated by one or more of said information sources and transmitted via said second switching matrix,
(c) a transmit amplifier having an input thereof connected to said bidirectional and unidirectional signal terminals for receiving and transmitting said signals carried by said bidirectional terminal and said information signals received by said unidirectional terminal to a predetermined one of said signal ports.

21. A communication system as defined in claim 20, wherein said one or more interface circuits are subscriber line interface circuits for connection to respective local subscriber sets.

22. A communication system as defined in claim 20, wherein said one or more interface circuits are trunk circuits for connection to respective outside telephone lines.

23. A communication system as defined in claim 2, wherein at least one of said information signal source circuits is a DTMF generator.

24. A communication system as defined in claim 2, wherein at least one of said information signal source circuits is a dial tone generator.

25. A communication system as defined in claim 2, wherein at least one of said information signal source circuits is a ringing tone generator.

26. A communication system as defined in claim 2, wherein at least one of said information signal source circuits is a busy/error tone generator.

27. A communication system as defined in claim 2, wherein at least one of said information signal source circuits is a ring back tone generator.

28. A communication system as defined in claim 2, wherein said first and second switching matrices are each comprised of space switching matrices.

29. A communication system as defined in claim 2, wherein at least one of said information signal source circuits is a DTMF generator circuit having control inputs thereof connected to said central control means, for receiving additional ones of said control signals and generating DTMF tones in response thereto, and filter means connected to said DTMF generator for filtering said DTMF tones prior to transmission of said tones via said second switching matrix.

* * * * *